Nov. 11, 1958     D. H. BURDETTE     2,859,805
COMPRESSOR FOR INFLATING TUBELESS TIRES
Filed March 16, 1956
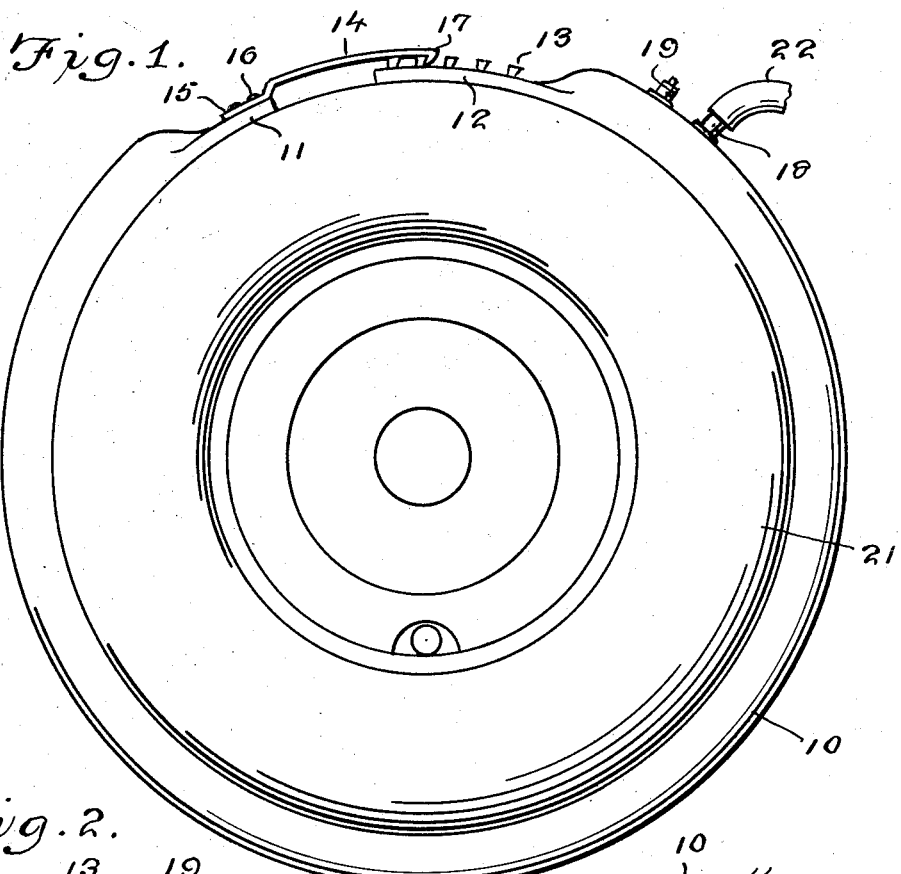
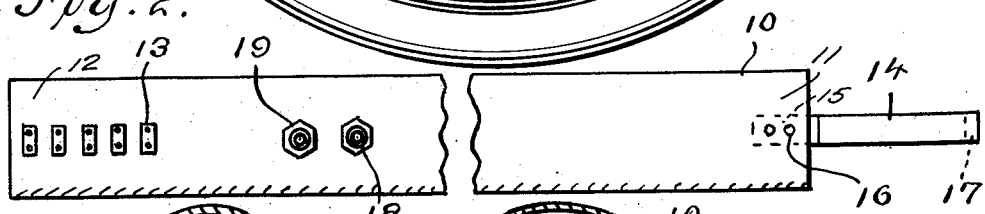
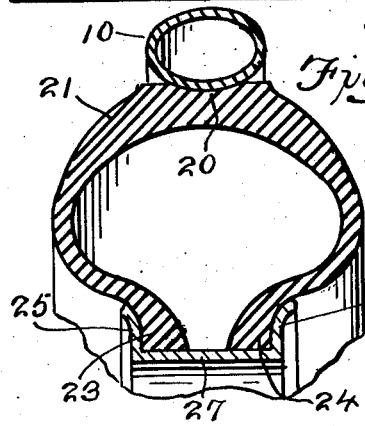
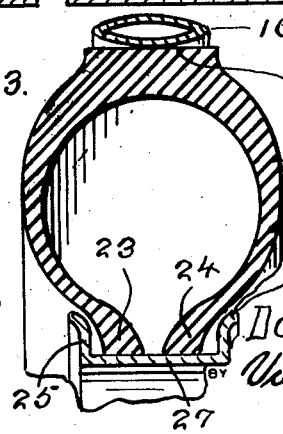
INVENTOR.
David H. Burdette
ATTORNEYS

United States Patent Office 2,859,805
Patented Nov. 11, 1958

2,859,805
COMPRESSOR FOR INFLATING TUBELESS TIRES
David H. Burdette, Bellwood, W. Va.
Application March 16, 1956, Serial No. 572,008
1 Claim. (Cl. 157—1.21)

This invention relates to devices for mounting shoes or casings of tubeless tires on rims where it is essential that the beads on the inner edges of the casings are secured by an adhesive or the like to flanges at the sides of the rim to provide a permanent seal, and in particular a device for applying pressure continuously around the outer surface of the tire to spread the beads whereby the beads are forced against the surfaces of the flanges of the rim.

The purpose of this invention is to provide means for applying pressure continuously around the outer surface of a tire wherein the pressure is equalized at all points of the tire and wherein the pressure may be increased to compensate for the weight or thickness of the tire.

In applying shoes or casings of tires to rims of wheels where inner tubes are not used it is necessary to obtain a seal between the outer surfaces of circular beads on the inner edges of the side walls of the tire and the arcuate flanges at the sides of the rim as it is difficult to urge the beads against the flanges of the rim without a tube in the tire. With this thought in mind this invention contemplates a device for applying pressure to the outer surface of a tire whereby with the pressure applied in the center of the tread the peripheral portion of the tire is drawn inwardly with the result that the side walls and beads on the open edges of the tire are spread.

The object of this invention is, therefore, to provide means for applying pressure continuously around the center of the tread of a tire to facilitate mounting the tire on a rim whereby the pressure may be increased as desired.

Another object of the invention is to provide a device for applying pressure to the outer surface of the casing of a tubeless tire in which the pressure is equalized at all points throughout the periphery of the tire and in which the device may be used on tires now in use without changing the tire structure.

A further object of the invention is to provide a device for applying pressure continuously around a tire in which the device is of a simple and economical construction.

With these and other objects and advantages in view the invention embodies a tube having fastening elements at the ends for connecting the ends and having an air inlet connection and a safety valve therein.

Other features and advantages of the invention will appear from the following description taken in connection with the drawing, wherein:

Figure 1 is a side elevational view of a wheel of a motor vehicle showing the compressor in the position in which it is used on the tire of the wheel.

Figure 2 is a plan view of the compressor with the device in the free position and with parts of the device broken away.

Figure 3 is a cross section through a tire and rim upon which the tire is mounted showing the compressor on the outer surface of the tire whereby the beads on the inner edges of the tire are retained against flanges at the sides of the rim.

Figure 4 is a cross section similar to that shown in Fig. 3 illustrating the released position of the tire with air pressure in the tube of the device relieved whereby the beads on the inner edges of the side walls of the tire are contracted and the outer surfaces thereof are spaced from flanges of the rim of the wheel.

Referring now to the drawing wherein like reference characters denote corresponding parts the improved tubeless tire mounting device of this invention includes a flexible tubular member 10 having sealed and flattened ends 11 and 12 with the end 12 provided with spaced lugs 13 and with a pawl 14 having an offset base 15 secured to the end 11 with fasteners 16 and having a projection 17 on the opposite end adapted to grip the lugs 13 of the end 12.

The tubular member 10 is provided with a filling connection or valve 18 and a safety or relief valve 19.

In use the tubular member 10 is positioned against the center of the tread 20 of a tire 21 and with the projection 17 snapped over one of the lugs 13 air is inserted through a tube 22 into the tubular member 10 through the nipple or connection 18 whereby the tubular member 10 is inflated causing pressure continuously around the outer surface of the tire 21 and spreading beads 23 and 24 on the inner edges of the tire as shown in Fig. 3.

The tubular member 10 is preferably made of flexible elastic material whereby with the projection 17 snapped over one of the lugs 13 with the tube positioned around the periphery of a tire, air inserted under pressure through the nipple 18 forces the center of the tread 20 inwardly with the result that the beads 23 and 24 are forced outwardly against flanges 25 and 26 of a rim 27. The lugs 13 and offset end 15 of the pawl 14 are secured to ends of the tubular member 10 with rivets or other suitable fastening elements.

By this means pressure is applied continuously around the outer surface of the tire and the pressure may be increased or decreased as desired to force the beads against inner surfaces of the flanges of the rim.

Upon the application of pressure to the inside of the tire the tension of the compression band is vastly increased. This creates a hazard with lever type compression bands and makes release difficult. These objections are eliminated in the pneumatic band of this invention as release is effected by slowly opening a valve whereby tension subsides gradually.

The ends of the tubular member 10 may be connected by the pawl and lugs, as shown, or by other suitable connecting means.

It will be understood that modifications, within the scope of the appended claim, may be made in the design and arrangement of the parts without departing from the spirit and intention of the invention.

What is claimed is:

In a mounting device for shoes of tubeless tires, the combination which comprises a flexible tubular member having sealed and flattened ends, said tubular member being adapted to be positioned around the outer surface of a motor vehicle tire, lugs mounted on the outer surface of one flattened end of the tube, a pawl mounted on the opposite flattened end of the tubular member and positioned to engage one of the lugs for securing the tubular member in position upon the tire casing, an inflating valve mounted in the tubular member and a relief valve also mounted in the tubular member.

References Cited in the file of this patent
UNITED STATES PATENTS

| 1,559,972 | Midgley | Nov. 3, 1925 |
| 1,598,561 | Coomer | Aug. 31, 1926 |
| 2,468,133 | Sullivan | Apr. 26, 1949 |
| 2,660,174 | Saemann | Nov. 24, 1953 |